G. P. McDONNELL.
STARTING MECHANISM FOR THE MOTORS OF MOTOR ROAD VEHICLES.
APPLICATION FILED JAN. 18, 1916.

1,211,605.

Patented Jan. 9, 1917.
3 SHEETS—SHEET 1.

Inventor
G. P. McDonnell
by Wright Brown Quinby May
Attorneys

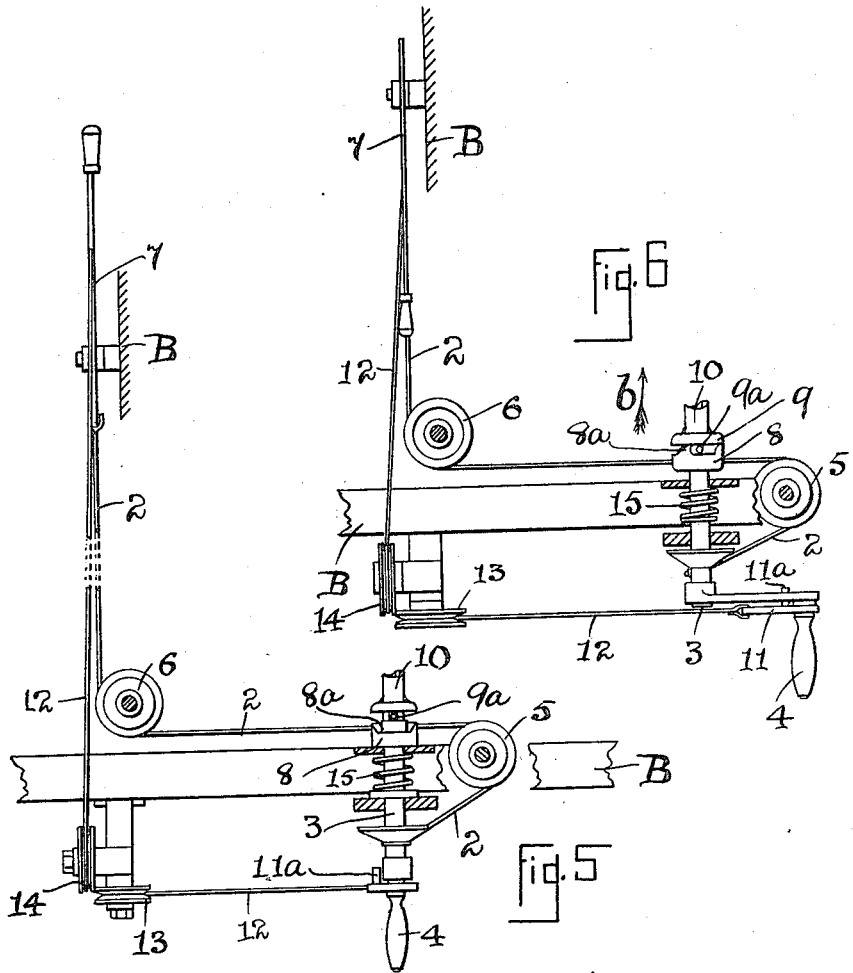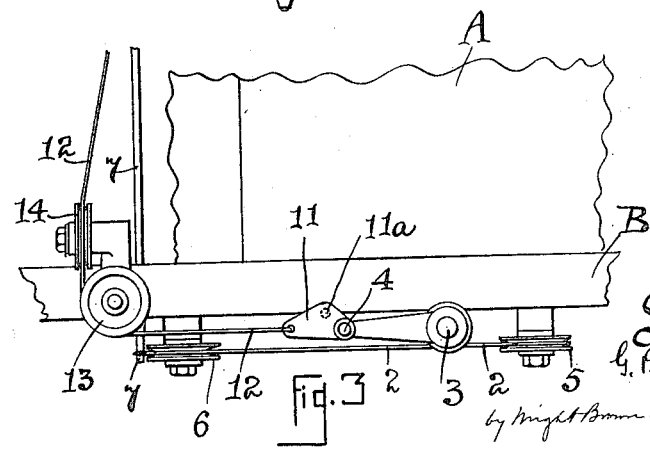

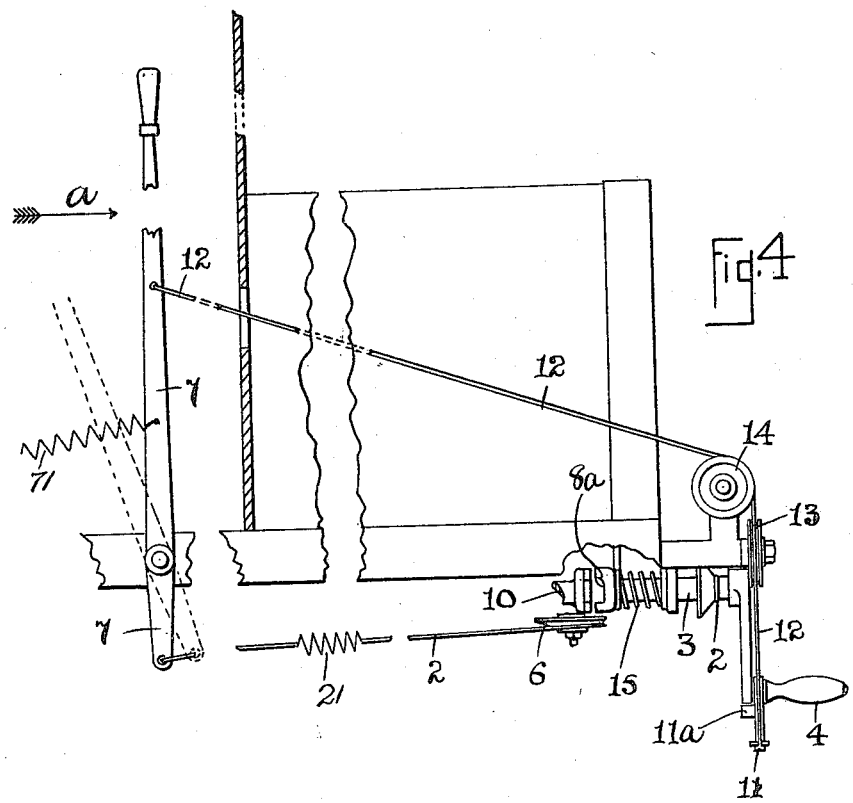

UNITED STATES PATENT OFFICE.

GEORGE PATRICK McDONNELL, OF MULLINAHONE, IRELAND.

STARTING MECHANISM FOR THE MOTORS OF MOTOR ROAD-VEHICLES.

1,211,605.   Specification of Letters Patent.   Patented Jan. 9, 1917.

Application filed January 18, 1916. Serial No. 72,842.

*To all whom it may concern:*

Be it known that I, GEORGE PATRICK MC-DONNELL, a subject of the King of Great Britain, and resident of Mullinahone, county of Tipperary, Ireland, have invented a certain new and useful Improvement in Starting Mechanism for the Motors of Motor Road-Vehicles, of which the following description, having reference to the accompanying sheets of drawings, is a specification.

My invention relates to apparatus for starting the motors of motor vehicles into action, and the object of my invention is to produce such devices or apparatus as may be readily fixed in position and which may be brought immediately under the control of the driver or user of the vehicle while seated therein, and which are comparatively simple in construction and cheap to produce.

Figure 1:
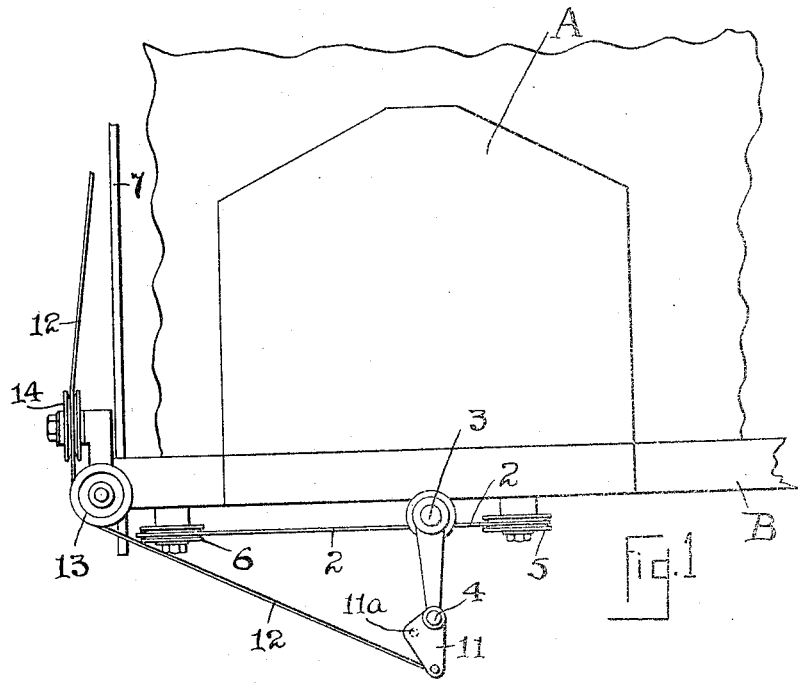
Figure 2:
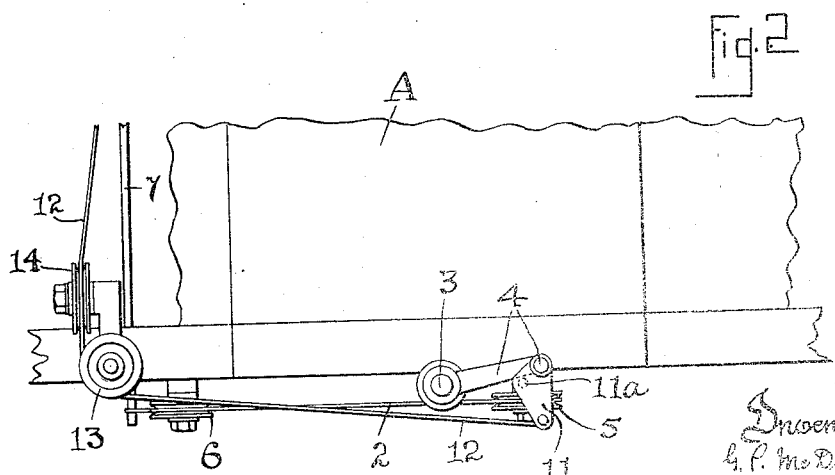

In the accompanying sheets of drawings;—Figure 1 is a front elevation of sufficient of a motor car or vehicle to show the application thereto of my improved parts, such parts being shown in position as midway between the two extremes of their paths of motion. Fig. 2 is a similar view to Fig. 1 but illustrates certain of the parts adjusted in position by the driver forcing the handle forward prior to the starting of the motor as hereinafter described. Fig. 3 is a similar view to Fig. 1 and shows the position of certain parts when the driver has operated same to start the motor into action. Fig. 4 is a side elevation illustrating the parts shown by the former figures, the handle shown in full lines being on its mid position or with the parts in the relative position shown by Fig. 1. Fig. 5 is a plan of my improved devices when they are in position shown by Fig. 1. Fig. 6 is a similar plan to Fig. 5 but shows the devices in the positions they occupy as illustrated by Fig. 2.

A indicates the cover or bonnet which incloses the motor on the vehicle.

B indicates certain parts of the chassis or framework which supports the body and other parts.

In carrying my invention into effect I make use of a cord or preferably a light cable 2 the end of which I secure to the shaft 3 upon which the starting handle 4 is mounted, in such manner that it will encircle said shaft 3 so that by extending therefrom to pass around the grooved pulley 5 and forward around another guide pulley 6 it may be connected to the lower end of the lever 7. It is obvious that for certain classes of cars or vehicles one guide pulley may be sufficient or that more than the number I have described may be required, as the construction and arrangement of the parts on the vehicle may render necessary. Or the cable may be made to slide over stationary guide surfaces provided the friction thereon is not too great. By this cable 2 being thus coupled to the lever 7 when the upper end of said lever 7 is moved by the driver in the direction indicated by the arrow *a* the lower end thereof will pull or force the cable 2 to cause the shaft 3 to rotate thus bringing said shaft 3 from its normal position into the position shown by Fig. 2.

In some part of the length of the cable 2 I may mount or fix a spring 21 which will permit a certain yield when the cable is actuated by the lever 7. Again, it is obvious that instead of coupling the cable 2 to a hand lever 7 I may have an independent handle fixed to the end of said cable 2 so that the driver may by laying hold of such handle pull the cable 2 to actuate the shaft 3 direct and without the movement of the lever. The action of the cable 2 over the shaft 3 as hereinbefore described causes said shaft 3 to rotate from one position to the other as explained, and at the same time also causes it to move in the direction of its length as indicated by the arrow *b* (see Fig. 6), thus enabling the clutch coupling 8 mounted on the end of said shaft 3 to engage with the clutch coupling 9 fixed on the end of the shaft that has to be rotated in order to start the motor into action. The advancing of the shaft 3 in the direction indicated by the arrow *b* brings the prong or hooked part 8ª on the coupling 8 into position to lay hold of the pin 9ᵃ forming the clutch coupling 9, so that on the shaft 3 being rotated in the opposite direction as hereinafter described this part 8ᵃ will keep in contact with said pin 9ᵃ.

On the outer end of the lever carrying the handle 4 is pivoted the swiveling bracket 11, see Figs. 1 to 6. To the end of the bracket 11 is attached another cord or cable 12, which is arranged to pass around the pulley 13 and forward over another pulley 14 so that it may finally extend to be secured to the lever handle 7. Although I have shown two guide pulleys 13 and 14 as being employed in connection with this cable 12, more than this number of guide pulleys may be required for other forms of vehicles whereas in other cases no guide pulleys may be required.

As hereinbefore stated on the driver moving the handle 7 forward in the direction indicated by arrow *a* it brings the clutch 8 into engagement with the clutch 9 (even against the retracting action of the spring 15) at the same time said handle 7 will permit the cable 12 to recede so that the handle 4 may move into position shown by Fig. 2, in which position it will have brought the link 11 so that the pin 11ᵃ extending from it will rest against the lever of the handle 4 shown by said Fig. 2. When the several parts have been removed into the position stated, on the driver pulling the handle lever 7 in the opposite direction to that indicated by the arrow *a* the cable 12 commences to move the handle 4 and will continue to move it from the position in which it started to the finishing position shown by Fig. 3 which motion, it will be observed is through rather more than half a revoluton. Thus an impetus is given to the shafts 10 to start the motor as desired. The spring 71 is secured to the handle 7 and to any suitable fixed part of the vehicle so that it may bring said lever when free back to its rear and normal position somewhat as shown by broken lines Fig. 4.

By making use of the cable bracket or link 11 with its projecting pin 11ᵃ to engage with the lever of the handle 4 I am enabled to move the shaft 3 through more than half a revolution as described by reason of said link 11 altering its position and keeping the cable 12 from acting across the dead center of the shaft 3.

The application of my parts as hereinbefore described do not hinder the driver from actuating the handle 4 to start the engine or motor without the employment of the devices that I have added, while the mounting of the lever 7 in the position indicated enables said driver without leaving his seat to carry out the starting of the vehicle as described.

I have hereinbefore described one arrangement of the several parts forming my invention and have illustrated one method of its application, but I would have it understood that I am aware that varied arrangements of the guide pulleys and levers may be made use of, hence I do not confine myself to the precise details given.

Such being the nature and object of my invention, what I claim is:—

1. The combination with a motor shaft provided with a clutch member, of a starting shaft, a clutch member on said starting shaft, means for normally keeping the clutch member on said starting shaft out of contact with the clutch member on said motor shaft, a starting member disposed at the rear of said starting shaft, and connections between said starting member and said starting shaft arranged to cause rotation and lengthwise axial movement of said starting shaft when said starting member is moved in one direction to bring said clutch members into potential coacting relation, and to rotate said starting shaft in the opposite direction to impart rotary motion to the motor shaft when said starting member is moved in the opposite direction.

2. The combination with a motor shaft provided with a clutch member, of a starting shaft, a clutch member on said starting shaft, means for normally keeping the clutch member on said starting shaft out of contact with the clutch member on said motor shaft, a starting lever disposed at the rear of said starting shaft, a starting handle secured at the front of said starting shaft, connections between said starting lever and said starting shaft operable by movement of said starting lever in one direction to cause rotation and rearward movement of said starting shaft to bring its clutch member into potential coacting relation with the clutch member on the motor shaft, and connections between said starting lever and said starting handle operable by movement of said starting lever in the opposite direction to cause rotation of said starting shaft whereby rotation is imparted to the motor shaft.

3. The combination with a motor shaft provided with a clutch member, of a starting shaft, a clutch member on said starting shaft, means for normally keeping the clutch member on said starting shaft out of contact with the clutch member on said motor shaft, a starting lever disposed at the rear of said starting shaft, a starting handle secured at the front of said starting shaft, connections, including a tension member, between said starting lever and said starting shaft operable by movement of said starting lever in one direction to cause rotation and rearward movement of said starting shaft to bring its clutch member into potential coacting relation with the clutch member on the motor shaft, and connections between said starting lever and said starting handle operable by movement of said starting lever in the opposite direction to cause rotation of said starting shaft whereby rotation is imparted to the motor shaft.

GEORGE PATRICK McDONNELL.

Witnesses:
JOHN JOSEPH BRADSHAW,
EDWARD L. ADAMS, Jr.